(12) United States Patent
Maehara et al.

(10) Patent No.: US 11,256,248 B2
(45) Date of Patent: Feb. 22, 2022

(54) RECEPTION RANGE VARYING SYSTEM, VEHICLE CONTROL DEVICE, AND PORTABLE DEVICE

(71) Applicant: DENSO CORPORATION, Kariya (JP)

(72) Inventors: Hiroaki Maehara, Kariya (JP); Ryusuke Ishikawa, Kariya (JP); Takayuki Hattori, Kariya (JP); Tetsuya Miwa, Kariya (JP); Tatsuhito Yoshida, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/696,498

(22) Filed: Nov. 26, 2019

(65) Prior Publication Data

US 2020/0117186 A1 Apr. 16, 2020

Related U.S. Application Data

(63) Continuation of application No. PCT/JP2018/013521, filed on Mar. 30, 2018.

(30) Foreign Application Priority Data

Jun. 2, 2017 (JP) .............................. JP2017-110302
Jul. 25, 2017 (JP) .............................. JP2017-143911

(51) Int. Cl.
*G05D 1/00* (2006.01)
*G07C 9/00* (2020.01)
*H04B 17/318* (2015.01)

(52) U.S. Cl.
CPC ......... *G05D 1/0022* (2013.01); *G05D 1/0016* (2013.01); *G07C 9/00309* (2013.01);
(Continued)

(58) Field of Classification Search
None
See application file for complete search history.

(56) References Cited

U.S. PATENT DOCUMENTS 4,973,958 A * 11/1990 Hirano ............... G07C 9/00309
307/10.2
5,923,454 A * 7/1999 Eastmond ............... H04L 27/04
398/202

(Continued)

FOREIGN PATENT DOCUMENTS

EP 2251837 * 11/2010 ............... G07C 9/00
JP 200689946 A 4/2006

(Continued)

*Primary Examiner* — Aniss Chad
*Assistant Examiner* — Tischi Balachandra
(74) *Attorney, Agent, or Firm* — Harness, Dickey & Pierce, P.L.C.

(57) ABSTRACT

A reception range varying system includes a vehicle control device and a portable device. The reception range varying system determines whether a position where the portable device exists is within an execution range which enables execution of vehicle control over the portable device, or within a reception range but outside the execution range, and narrows the reception range so that the portable device is positioned outside the reception range while maintaining the reception range at a size equivalent to or larger than the execution range, on the basis that the position where the portable device exists is within the reception range but outside the execution range.

12 Claims, 10 Drawing Sheets

(52) U.S. Cl.
CPC ... *H04B 17/318* (2015.01); *G05D 2201/0213* (2013.01); *G07C 2009/00341* (2013.01)

(56) References Cited

U.S. PATENT DOCUMENTS

| | | | | |
|---|---|---|---|---|
| 6,670,883 | B1* | 12/2003 | Asakura | B60R 25/24 307/10.1 |
| 6,747,545 | B2 | 6/2004 | Nowottnick | H04W 12/1202 340/5.61 |
| 7,209,030 | B2* | 4/2007 | Nolan | B60R 25/24 340/10.33 |
| 7,852,194 | B2* | 12/2010 | Konno | B62H 5/20 340/3.7 |
| 8,164,416 | B2* | 4/2012 | Lee | H04B 1/1615 340/5.6 |
| 8,587,403 | B2* | 11/2013 | Ghabra | G07C 9/00309 340/5.61 |
| 9,042,426 | B1* | 5/2015 | Matsumoto | G01S 13/82 375/131 |
| 9,102,296 | B2* | 8/2015 | Seiberts | B60R 25/2072 |
| 9,179,492 | B2* | 11/2015 | Meier | G06K 19/07792 |
| 9,260,079 | B2* | 2/2016 | Miyazawa | B60R 25/24 |
| 9,349,236 | B2* | 5/2016 | Mutti | B60R 25/24 |
| 9,378,597 | B2* | 6/2016 | Shen | G07C 9/00658 |
| 9,437,064 | B1* | 9/2016 | Ghabra | G07C 9/00309 |
| 9,478,087 | B2* | 10/2016 | Proefke | G07C 9/00309 |
| 9,646,443 | B2* | 5/2017 | Hamada | G07C 9/00309 |
| 9,672,671 | B2* | 6/2017 | Seiberts | G07C 9/00309 |
| 9,747,736 | B2* | 8/2017 | Austen | B60R 25/241 |
| 9,858,735 | B2* | 1/2018 | Spahl | H04W 52/02 |
| 9,972,150 | B2* | 5/2018 | Da Deppo | G07C 9/00309 |
| 10,000,187 | B2* | 6/2018 | Hamada | B60R 25/245 |
| 10,008,062 | B2* | 6/2018 | Austen | B60R 25/245 |
| 10,055,917 | B2* | 8/2018 | Spahl | H04W 52/02 |
| 10,129,009 | B2* | 11/2018 | Meier | G07C 9/00309 |
| 10,157,542 | B2* | 12/2018 | Sanji | B60R 25/24 |
| 10,210,687 | B2* | 2/2019 | Hiramine | B60R 25/24 |
| 10,328,901 | B2* | 6/2019 | Sanji | B60R 25/241 |
| 10,438,429 | B2* | 10/2019 | Hayashi | H04Q 9/00 |
| 10,438,430 | B2* | 10/2019 | Hayashi | G07C 9/00309 |
| 10,510,198 | B2* | 12/2019 | Austen | B60R 25/241 |
| 10,543,808 | B2* | 1/2020 | Lin | B60R 25/00 |
| 10,803,687 | B1* | 10/2020 | Khamis | G07C 9/00309 |
| 2001/0033222 | A1* | 10/2001 | Nowottnick | H04W 4/023 340/5.61 |
| 2003/0216124 | A1* | 11/2003 | Emmerling | B60R 25/24 455/73 |
| 2005/0057408 | A1* | 3/2005 | Asakura | E05B 81/78 343/711 |
| 2005/0237160 | A1* | 10/2005 | Nolan | G06K 19/0705 340/10.33 |
| 2005/0237161 | A1* | 10/2005 | Lee | H04W 52/0225 340/10.33 |
| 2005/0237220 | A1* | 10/2005 | Nolan | B60R 25/24 340/12.34 |
| 2006/0061459 | A1* | 3/2006 | Kawamura | G07C 9/00309 340/426.36 |
| 2006/0142916 | A1* | 6/2006 | Onuma | B60G 17/015 701/38 |
| 2007/0109093 | A1* | 5/2007 | Matsubara | G07C 9/00309 340/5.61 |
| 2007/0162191 | A1* | 7/2007 | Matsubara | G07C 9/00309 701/1 |
| 2007/0205862 | A1* | 9/2007 | Brilion | G07C 9/00309 340/5.72 |
| 2008/0088411 | A1* | 4/2008 | Ghabra | B60W 30/18054 340/5.64 |
| 2008/0309451 | A1* | 12/2008 | Zellweger | E05B 19/0082 340/3.32 |
| 2009/0256674 | A1* | 10/2009 | Lee | B60R 25/24 340/5.6 |
| 2010/0321154 | A1* | 12/2010 | Ghabra | G07C 9/00309 340/5.61 |
| 2011/0309922 | A1* | 12/2011 | Ghabra | G07C 9/00309 340/426.36 |
| 2012/0139691 | A1* | 6/2012 | Mori | B60R 25/24 340/5.2 |
| 2012/0179306 | A1* | 7/2012 | Saiki | B60R 25/2072 701/2 |
| 2012/0236957 | A1* | 9/2012 | Tomita | H04L 27/12 375/272 |
| 2013/0035042 | A1* | 2/2013 | Matsumoto | H04W 88/04 455/66.1 |
| 2013/0107762 | A1* | 5/2013 | Meier | G06K 19/0724 370/277 |
| 2014/0203907 | A1* | 7/2014 | Ohata | G07C 9/00309 340/5.61 |
| 2014/0240090 | A1* | 8/2014 | Mutti | B60R 25/24 340/5.61 |
| 2014/0368313 | A1* | 12/2014 | Seiberts | G07C 9/00309 340/5.61 |
| 2014/0368314 | A1* | 12/2014 | Lee | G07C 9/00309 340/5.61 |
| 2014/0375420 | A1* | 12/2014 | Seiberts | B60R 25/20 340/5.31 |
| 2015/0074805 | A1* | 3/2015 | Choi | H04L 63/0853 726/22 |
| 2015/0077225 | A1* | 3/2015 | Proefke | G07C 9/00309 340/5.72 |
| 2015/0130589 | A1* | 5/2015 | Miyazawa | B60R 25/24 340/5.61 |
| 2015/0161834 | A1* | 6/2015 | Spahl | G07C 9/00309 340/5.61 |
| 2015/0170444 | A1* | 6/2015 | Yasui | G08C 17/02 340/5.61 |
| 2015/0279138 | A1* | 10/2015 | Nagai | B60R 25/24 340/5.72 |
| 2015/0302673 | A1* | 10/2015 | Seiberts | G07C 9/30 340/5.61 |
| 2015/0325070 | A1* | 11/2015 | Miyazawa | G07C 9/00309 340/5.63 |
| 2016/0042579 | A1* | 2/2016 | Austen | B60R 25/2018 340/5.61 |
| 2016/0093130 | A1* | 3/2016 | Shen | H04W 4/80 340/5.61 |
| 2016/0117877 | A1* | 4/2016 | Hamada | G07C 9/00309 340/5.61 |
| 2016/0127116 | A1* | 5/2016 | Meier | G06K 7/10366 370/282 |
| 2016/0267734 | A1* | 9/2016 | Hamada | G07C 9/00309 |
| 2016/0267735 | A1* | 9/2016 | Hamada | G07C 9/00309 |
| 2016/0304053 | A1* | 10/2016 | Tomita | B60R 25/2081 |
| 2016/0325710 | A1* | 11/2016 | Honkanen | B60R 25/209 |
| 2017/0004664 | A1* | 1/2017 | Yamamoto | G07C 9/00309 |
| 2017/0021801 | A1* | 1/2017 | Yamamoto | B60R 25/245 |
| 2017/0076524 | A1* | 3/2017 | Yoshihara | B60R 16/02 |
| 2017/0103594 | A1* | 4/2017 | Kim | G07C 9/00182 |
| 2017/0129456 | A1* | 5/2017 | Miyazawa | B60R 25/24 |
| 2017/0136992 | A1* | 5/2017 | Hamada | B60R 25/24 |
| 2017/0200335 | A1* | 7/2017 | Da Deppo | G07C 9/00309 |
| 2017/0249791 | A1* | 8/2017 | Woo | G07C 9/00309 |
| 2017/0253216 | A1* | 9/2017 | Nishidai | B60R 25/241 |
| 2017/0323504 | A1* | 11/2017 | Austen | B60R 25/24 |
| 2018/0050662 | A1* | 2/2018 | Sanji | H04B 17/318 |
| 2018/0053416 | A1* | 2/2018 | Sanji | G07C 9/00309 |
| 2018/0089919 | A1* | 3/2018 | Ishihara | G07C 9/00309 |
| 2018/0096545 | A1* | 4/2018 | Spahl | G07C 9/00309 |
| 2018/0118163 | A1* | 5/2018 | Murakami | B60R 25/01 |
| 2018/0276923 | A1* | 9/2018 | Hayashi | G06F 21/35 |
| 2018/0276924 | A1* | 9/2018 | Hayashi | G08C 25/02 |
| 2018/0276925 | A1* | 9/2018 | Hayashi | H04W 4/48 |
| 2018/0276926 | A1* | 9/2018 | Hayashi | B60R 25/245 |
| 2018/0308305 | A1* | 10/2018 | Austen | B60R 25/2018 |
| 2018/0330560 | A1* | 11/2018 | Hiramine | G07C 9/00309 |
| 2019/0039570 | A1* | 2/2019 | Foster | G07C 9/00309 |
| 2019/0147678 | A1* | 5/2019 | Saiki | H01Q 1/3241 340/5.64 |
| 2019/0219678 | A1* | 7/2019 | Miyazawa | G01S 11/06 |
| 2019/0375372 | A1* | 12/2019 | Sanji | H04W 4/023 |

(56) References Cited

U.S. PATENT DOCUMENTS

2019/0381972 A1\* 12/2019 Takigawa .............. H04W 12/08
2020/0045537 A1\* 2/2020 Colombo ........... G07C 9/00571
2020/0382930 A1\* 12/2020 Zheng ................... H04W 4/023

FOREIGN PATENT DOCUMENTS

| JP | 2011223499 A | 11/2011 |
| --- | --- | --- |
| JP | 2015113644 A | 6/2015 |
| JP | 2015137502 A | 7/2015 |
| JP | 2016204823 A | 12/2016 |
| JP | 2016211329 A | 12/2016 |
| JP | 6137687 B2 | 5/2017 |

\* cited by examiner

RECEPTION RANGE VARYING SYSTEM, VEHICLE CONTROL DEVICE, AND PORTABLE DEVICE

CROSS REFERENCE TO RELATED APPLICATIONS

The present application is a continuation application of International Patent Application No. PCT/JP2018/013521 filed on Mar. 30, 2018, which designated the U.S. and claims the benefit of priority from Japanese Patent Applications No. 2017-110302 filed on Jun. 2, 2017 and No. 2017-143911 filed on Jul. 25, 2017. The entire disclosures of all of the above applications are incorporated herein by reference.

TECHNICAL FIELD

The present disclosure relates to a reception range varying system, a vehicle control device, and a portable device.

BACKGROUND

A vehicle control device for performing a function called a keyless entry system or a passive entry system has been known.

SUMMARY

The present disclosure describes a reception range varying system, a vehicle control device, and a portable device, in which a reception range that the portable device can receive a signal is variable. A reception range varying system may include a vehicle control device and a portable device. The reception range varying system may determine whether a position where the portable device exists is within an execution range which enables execution of vehicle control over the portable device, or within the reception range but outside the execution range, and narrows the reception range so that the portable device is positioned outside the reception range while maintaining the reception range at a size equivalent to or larger than the execution range, when the position where the portable device exists is within the reception range but outside the execution range.

DETAILED DESCRIPTION

Figure 1:
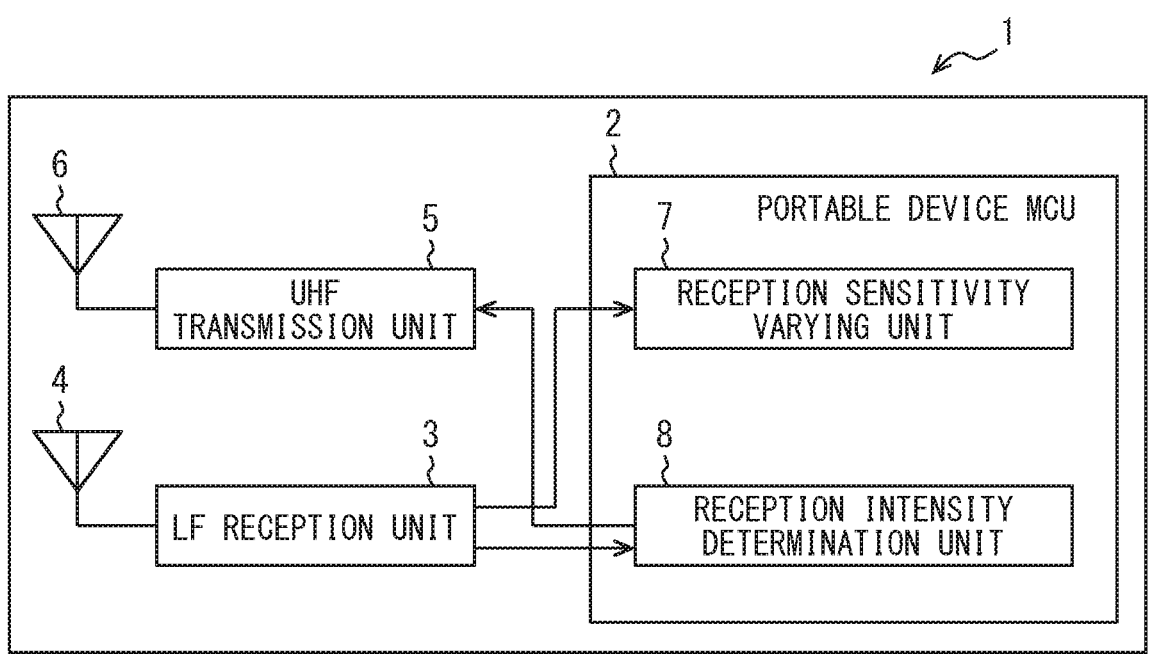
FIG. 1 is a block diagram showing a portable device according to a first embodiment.

In a vehicle control device, welcome control is considered. The welcome control is vehicle control for welcoming a user holding a portable device into a vehicle. The welcome control is, for example, control for lighting up a room lamp or a light disposed at the foot of the vehicle.

The vehicle control device transmits a response request signal for requesting a response from the portable device by a radio wave at a fixed interval. The portable device receives the response request signal. As a related art, the portable device determines the reception intensity of the received radio wave. The portable device causes a response signal to include the information of the determined reception intensity, and transmits the response signal to the vehicle control device. The vehicle control device determines, based on the reception intensity, whether or not the portable device exists within an execution range which is a range for executing the welcome control. Then, when the vehicle control device determines that the portable device exists within the execution range, the vehicle control device executes the welcome control.

In the case where it is determined, based on the reception intensity of the radio wave received by the portable device as in the related art, whether or not the portable device exists within the execution range which enables the execution of the vehicle control over the portable device, the portable device needs to be able to receive the response request signal transmitted by the vehicle control device, at least in a range wider than the execution range.

In addition, there is a request to vary the execution range. In the case of varying the execution range, a reception range in which the portable device can receive the response request signal needs to be wider than the widest execution range. Therefore, an area within the reception range but outside the execution range exists.

However, when the portable device exists outside the execution range, the vehicle control device does not execute the welcome control in response to transmission from the portable device. Therefore, the transmission of the response signal by the portable device when the portable device exists within the reception range but outside the execution range wastefully reduces battery life. From a viewpoint of convenience, improvement in battery life is required.

From the above viewpoint, or from another viewpoint not mentioned, further improvement is required for a reception range varying system, the vehicle control device, and the portable device.

A reception range varying system according to an aspect of the present disclosure is a reception range varying system that includes a vehicle control device and a portable device, and is configured such that a reception range in which the portable device can receive a signal transmitted by the vehicle control device is variable. A transmission side device that is one of the vehicle control device and the portable device includes a transmission unit that transmits an intensity determination signal. A reception side device that is the other of the vehicle control device and the portable device includes a determination signal reception unit that receives the intensity determination signal, and a reception intensity determination unit that determines a reception intensity of the intensity determination signal received by the determination signal reception unit. The reception range varying system includes: a determination unit that determines whether a position where the portable device exists is within an execution range which enables execution of vehicle control over the portable device, or within the reception range but outside the execution range, based on the reception intensity determined by the reception intensity determination unit; and a reception range setting unit that narrows the reception range so that the portable device is positioned outside the reception range while maintaining the reception range at a size equivalent to or larger than the execution range, on the basis that the determination unit determines that the position where the portable device exists is within the reception range but outside the execution range.

According to the reception range varying system according to the above-described aspect, the determination unit determines whether the position where the portable device exists is within the execution range which enables the execution of vehicle control over the portable device, or within the reception range but outside the execution range. As a result of the determination, the reception range setting unit narrows the reception range so that the portable device is positioned outside the reception range while maintaining the reception range at the size equivalent to or larger than the execution range, on the basis that the determination unit determines that the position where the portable device exists is within the reception range but outside the execution range.

Thereby, even when the portable device exists within the reception range, a reception range setting unit narrows the reception range so that the portable device exists outside the reception range. Therefore, it is possible to decrease the number of times that the portable device responds to the signal transmitted from a vehicle. Further, by decreasing the number of responses, it is possible to suppress the consumption of a battery included in the portable device.

A vehicle control device according to an aspect of the present disclosure includes: a transmission unit that transmits a response request signal for requesting a response from a portable device; a reception unit that receives a response signal returned by the portable device in response to the response request signal; a determination unit that determines a range in which the portable device exists; a change request unit that transmits to the portable device a reception sensitivity change request which is a request to change a reception range which is a range in which the portable device can receive the response request signal, based on the range in which the portable device exists; and a reception intensity confirmation unit that confirms a reception intensity of the portable device, based on the response signal. The determination unit sets an execution range that enables execution of vehicle control over the portable device and is narrower than the reception range, and has an outside-execution-range determination unit that determines that the portable device exists within the reception range and outside the execution range when the reception intensity is equal to or less than a predetermined threshold value. The change request unit has a sensitivity decrease request unit that transmits to the portable device a reception sensitivity decrease request to decrease a reception sensitivity of the portable device in order to narrow the reception range so that the portable device exists outside the reception range, when the outside-execution-range determination unit determines that the portable device exists within the reception range and outside the execution range.

A portable device according to an aspect of the present disclosure is a portable device that is used together with the vehicle control device, and includes: a portable device reception unit that receives the response request signal and the reception sensitivity change request; a reception sensitivity varying unit that changes a reception sensitivity in accordance with the reception sensitivity change request received by the portable device reception unit; a reception intensity determination unit that determines a reception intensity of the response request signal received by the portable device reception unit; and a portable device transmission unit that transmits to the vehicle the response signal including reception intensity information indicating the reception intensity determined by the reception intensity determination unit.

A portable device according to an aspect of the present disclosure includes: a determination signal reception unit that receives an intensity determination signal transmitted by a vehicle control device; a reception intensity determination unit that determines a reception intensity of the intensity determination signal received by the determination signal reception unit; a determination unit that determines whether a current position is within an execution range which enables execution of vehicle control over the portable device, or within a reception range in which the intensity determination signal can be received but outside the execution range, based on the reception intensity determined by the reception intensity determination unit; and a reception range setting unit that narrows the reception range so that the current position is positioned outside the reception range while maintaining the reception range at a size equivalent to or larger than the execution range, by decreasing a reception sensitivity when the determination unit determines that the current position is within the reception range but outside the execution range.

A plurality of embodiments will be described with reference to the accompanying drawings. In the embodiments, functionally and/or structurally corresponding parts and/or associated parts may be denoted by the same reference numerals or reference numerals having different numbers in the hundred's or higher place. It is possible to refer to the descriptions of other embodiments for the corresponding parts and/or the associated parts. Technical elements described in JP 2016-204823 A may be incorporated herein by reference.

First Embodiment (Portable Device)

Hereinafter, an embodiment will be described with reference to the drawings. FIG. 1 shows a portable device 1 according to the embodiment. In the first embodiment, the portable device 1 is a reception side device. The portable device 1 has a portable device MCU (Micro Control Unit) 2, an LF reception unit 3, an LF reception antenna 4, a UHF transmission unit 5, and a transmission antenna 6.

The portable device MCU 2 includes a CPU, a ROM, a RAM, and the like. The portable device MCU 2 executes various kinds of processing in accordance with a program stored in a memory. Means and/or functions provided by the portable device MCU 2 can be provided by software recorded in a substantive memory device and a computer for executing the software, only by software, only by hardware, or by the combination thereof. For example, in the case where the portable device MCU 2 is provided by electronic circuits as hardware, the means and/or functions can be provided by digital circuits including a large number of logic circuits or analog circuits.

The portable device MCU 2 has a reception sensitivity varying unit 7 and a reception intensity determination unit 8. The reception sensitivity varying unit 7 changes the reception sensitivity of the portable device 1. The LF reception unit 3 has an amplifier for adjusting the reception sensitivity. The reception sensitivity varying unit 7 adjusts the gain of the amplifier, and thereby changes the reception sensitivity. The reception sensitivity increases as the amount of current flowing into the amplifier is increased. The reception sensitivity decreases as the amount of current flowing into the amplifier is decreased. As the reception sensitivity increases;

even when the transmission power of a radio wave transmitted from a vehicle control device 100 remains the same, the distance in which the portable device 1 can receive the radio wave increases. That is, a reception range 30 (see FIG. 3) is widened. Thus, when the reception sensitivity varying unit 7 changes the reception sensitivity, the reception range 30 is changed. The reception sensitivity varying unit 7 corresponds to a reception range setting unit.

The reception intensity determination unit 8 determines the reception intensity of the radio wave received by the LF reception unit 3, using an RSSI circuit. The radio wave received by the LF reception unit 3 is, for example, a response request signal. Therefore, in the first embodiment, the response request signal corresponds to an intensity determination signal, and the LF reception unit 3 corresponds to a determination signal reception unit. The RSSI circuit is independent of the circuit with which the reception sensitivity varying unit 7 changes the reception sensitivity, and the reception intensity is not affected by the change of the reception sensitivity.

The LF reception antenna 4 is an antenna for receiving the radio wave in an LF band transmitted from the vehicle control device 100. The LF band is, for example, a frequency band of 30 kHz to 300 kHz. The LF reception unit 3 converts the radio wave received by the LF reception antenna 4 into a signal that can be processed by the reception intensity determination unit 8. The LF reception unit 3 outputs the converted signal to the reception intensity determination unit 8.

When the LF reception antenna 4 receives the radio wave in the LF band, the portable device MCU 2 outputs a response signal to the UHF transmission unit 5. The response signal has reception intensity information indicating the reception intensity determined by the reception intensity determination unit 8 and registration information indicating the portable device 1 corresponding to a vehicle 22. Due to the inclusion of the reception intensity information, the response signal corresponds to a measurement result signal. The UHF transmission unit 5 transmits the response signal from the transmission antenna 6 for transmitting the signal via a radio wave in a UHF band. The UHF band is, for example, a frequency band of 300 MHz to 3 GHz. The LF reception unit 3 corresponds to a portable device reception unit. The UHF transmission unit 5 corresponds to a portable device transmission unit.

(Vehicle Control Device)

Figure 2:
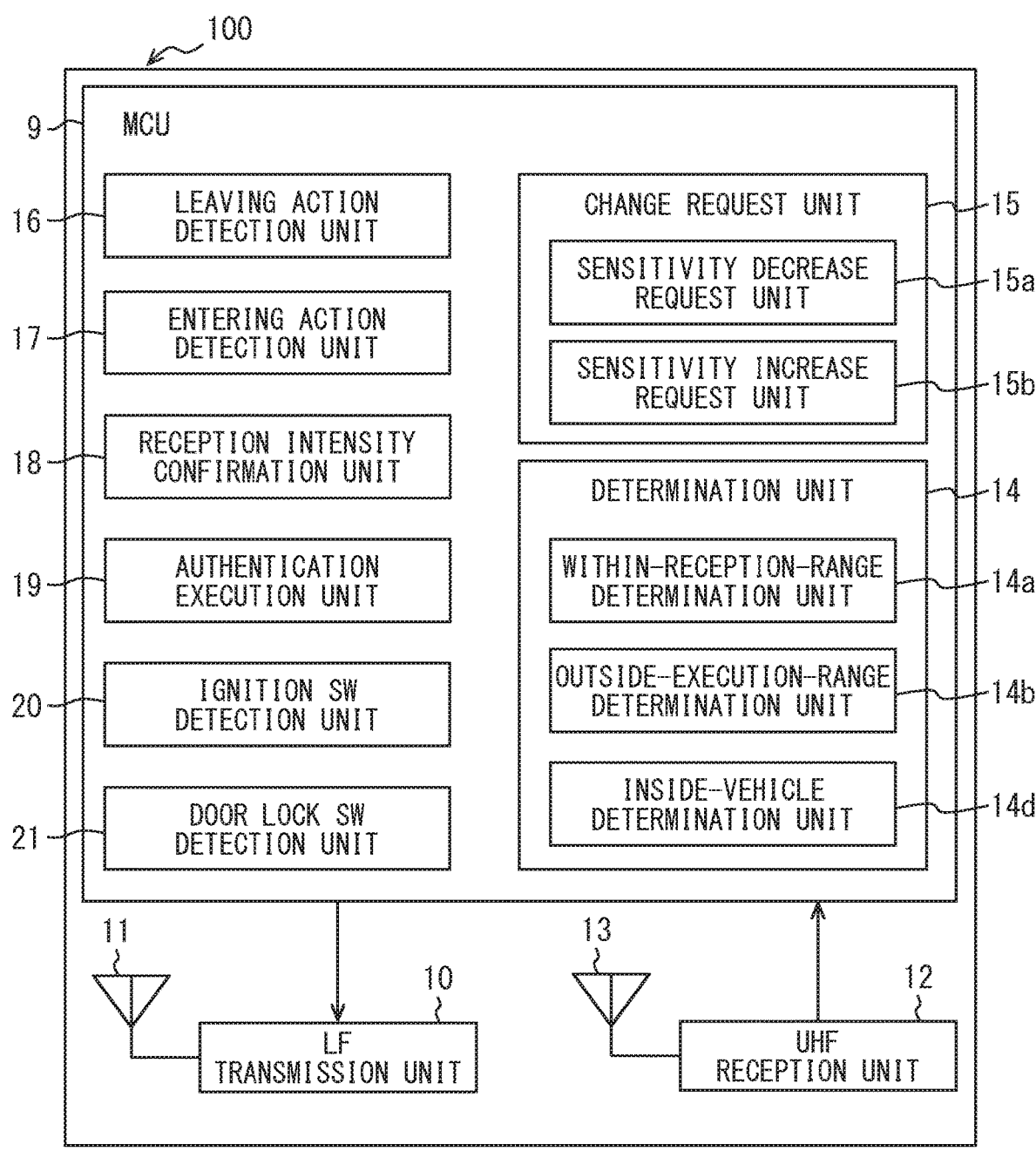
FIG. 2 is a block diagram showing a vehicle control device according to the first embodiment.

FIG. 2 shows the vehicle control device 100 according to the embodiment. In the first embodiment, the vehicle control device 100 is a transmission side device. The vehicle control device 100 has an MCU 9, an LF transmission unit 10, an LF antenna 11, a UHF reception unit 12, and a UHF reception antenna 13. A system configured with the portable device 1 and the vehicle control device 100 is referred to as a reception range varying system. The portable device 1 is a portable device used together with the vehicle control device. However, the portable device 1 may be used with another device.

The MCU 9 outputs to the LF transmission unit 10 the response request signal for requesting the response from the portable device 1. The LF antenna 11 is an antenna for transmitting the signal via the radio wave in the LF band. The LF transmission unit 10 transmits the response request signal to the portable device 1 through the LF antenna 11. When the portable device 1 receives the response request signal, the portable device 1 transmits the response signal to the vehicle control device 100. This transmission is also the response to the response request signal. The response request signal and the response signal are part of the signal for performing authentication, and an authentication execution unit 19 performs authentication based on the response request signal and the response signal. Therefore, the response request signal corresponds to an authentication signal. The LF transmission unit 10 corresponds to a transmission unit.

A plurality of LF antennas 11 are dispersedly disposed at a plurality of positions. The LF antenna 11 is disposed on the front side (e.g., in the hood) of the vehicle 22. The LF antenna 11 is disposed on the rear side (e.g., in the rear bumper under the trunk) of the vehicle 22. The LF antenna 11 is disposed on the right side (e.g., the door knob on the right side) of the vehicle 22. The LF antenna 11 is disposed on the left side (e.g., the door knob on the left side) of the vehicle 22. Further, the LF antenna 11 is also disposed in the cabin of the vehicle 22. It is not necessary that the LF antennas 11 are disposed at all of these positions. For example, the LF antenna 11 does not have to be disposed on the front side of the vehicle 22.

The UHF reception antenna 13 is an antenna for receiving the response signal transmitted from the portable device 1. The UHF reception unit 12 outputs the received response signal to the MCU 9. The UHF reception unit 12 corresponds to a reception unit.

The MCU 9 has a determination unit 14, a change request unit 15, a leaving action detection unit 16, an entering action detection unit 17, a reception intensity confirmation unit 18, the authentication execution unit 19, an ignition SW (switch) detection unit 20, and a door lock SW detection unit 21.

The ignition SW detection unit 20 detects the ON/OFF of the ignition of the vehicle 22. The door lock SW detection unit 21 detects the locking or unlocking of the door lock device of the vehicle 22. The reception intensity confirmation unit 18 confirms the reception intensity of the response request signal received by the portable device 1 based on the received response signal. The reception intensity confirmation unit 18 outputs the confirmed reception intensity to the determination unit 14.

The leaving action detection unit 16 detects a leaving action by which it can be assumed that a user is leaving the vehicle 22. The leaving action is, for example, an action in which the user locks the door lock device or an action in which the user turns off the ignition from an on state. Alternatively, the leaving action may be a door opening action after ignition-off, or may be a door closing action following the door opening action. The leaving action detection unit 16 detects the presence or absence of the leaving action from the detection result of the ignition SW detection unit 20. When the ignition is switched from ON to OFF, the leaving action detection unit 16 determines that the leaving action has been performed. The leaving action detection unit 16 detects the presence or absence of the leaving action from the detection result of the door lock SW detection unit 21. When the door lock device is locked, the leaving action detection unit 16 determines that the leaving action has been performed.

The entering action detection unit 17 detects an entering action by which it can be assumed that the user gets into the vehicle 22. The entering action is, for example, an action in which the user unlocks a door lock function. Alternatively, the entering action may be a door opening action after the unlocking of the door lock function, that is, the releasing of the door lock, or may be a door closing action following the door opening action. The entering action detection unit 17 detects the presence or absence of the entering action from the detection result of the door lock SW detection unit 21.

When the door lock function is unlocked, the entering action detection unit 17 determines that the entering action has been performed.

The determination unit 14 determines a range in which the portable device 1 exists. The determination unit 14 has a within-range determination unit 14a, an outside-execution-range determination unit 14b, and an inside-vehicle determination unit 14d.

When the UHF reception unit 12 receives the response signal, the within-range determination unit 14a determines that the portable device 1 exists within the reception range 30. The reception range 30 is a range in which the portable device 1 can receive the response request signal.

Figure 3:
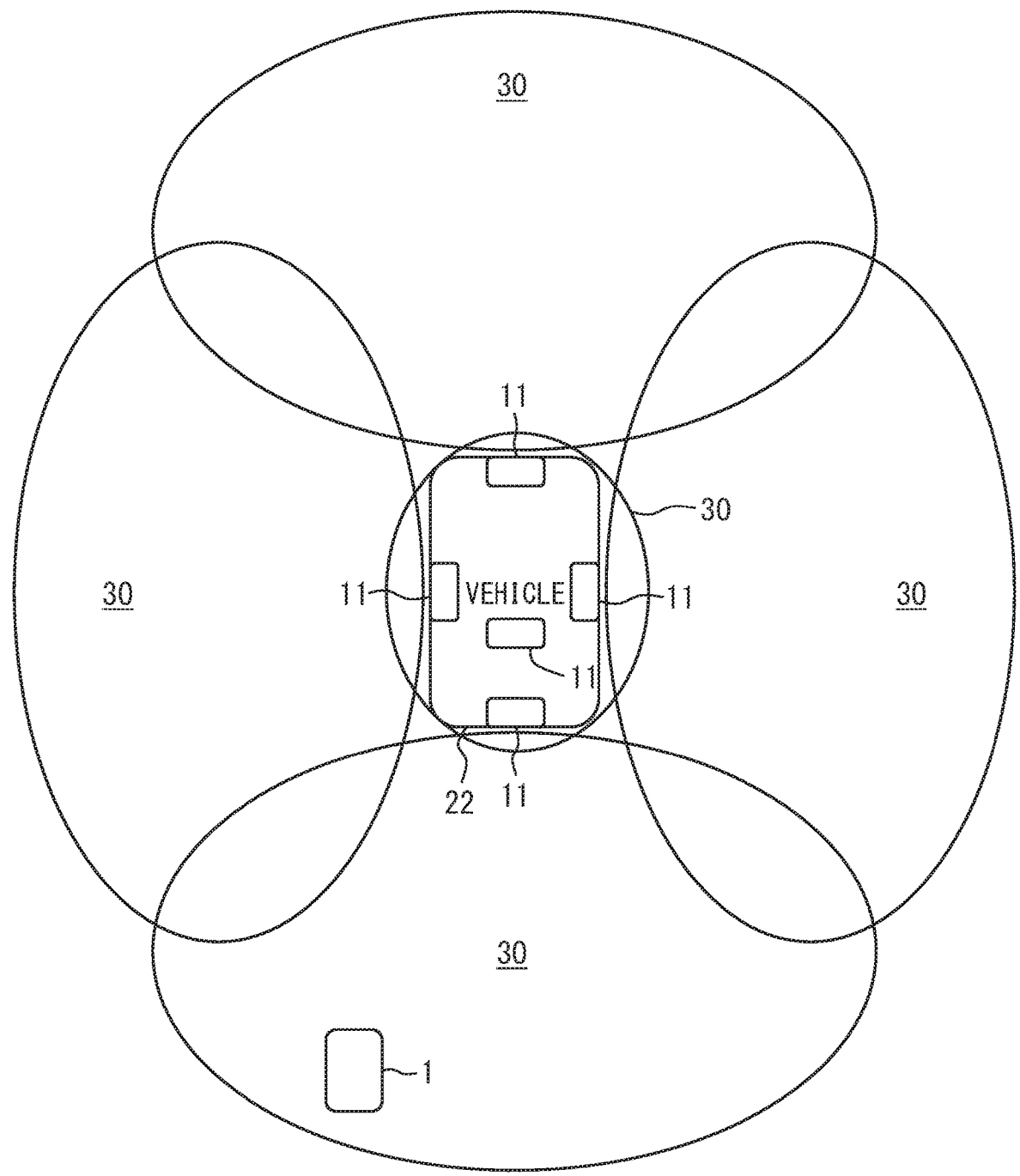
FIG. 3 is a bird's-eye view showing an example of a reception range.

As shown in FIG. 3, the LF antennas 11 are disposed on the front side, the rear side, the right side, and the left side of the vehicle 22. The LF antennas 11 transmit the radio wave having circular directivity in a horizontal plane toward the outside of the vehicle 22 from each LF antenna 11 as a base point. Further, the LF antenna 11 is also disposed in the cabin of the vehicle 22. Although FIG. 3 shows one LF antenna 11 in the cabin, two or more LF antennas 11 may be disposed in the cabin.

The LF antenna 11 disposed in the cabin transmits the radio wave toward the inside of the vehicle from the LF antenna 11 as a base point. Thereby, even when the portable device 1 exists inside the vehicle 22, the UHF reception unit 12 can receive the response signal. In FIG. 3, the reception range 30 formed so as to include the vehicle 22 conceptually shows the reception range 30 formed by the LF antenna 11 disposed in the cabin. In FIG. 3, the reception range 30 formed by the LF antenna 11 disposed in the cabin is shown together with the reception ranges 30 formed by the LF antennas 11 disposed on the front side, the rear side, the right side, and the left side of the vehicle 22. However, the reception range 30 formed by the LF antenna 11 disposed in the cabin and the reception ranges 30 formed by the LF antennas 11 disposed on the front side, the rear side, the right side, and the left side of the vehicle 22 form the reception ranges 30 are selectively formed. This is because either the LF antenna 11 disposed in the cabin or the LF antennas 11 disposed on the front side, the rear side, the right side, and the left side of the vehicle 22 selectively transmit the radio waves.

Figure 4:
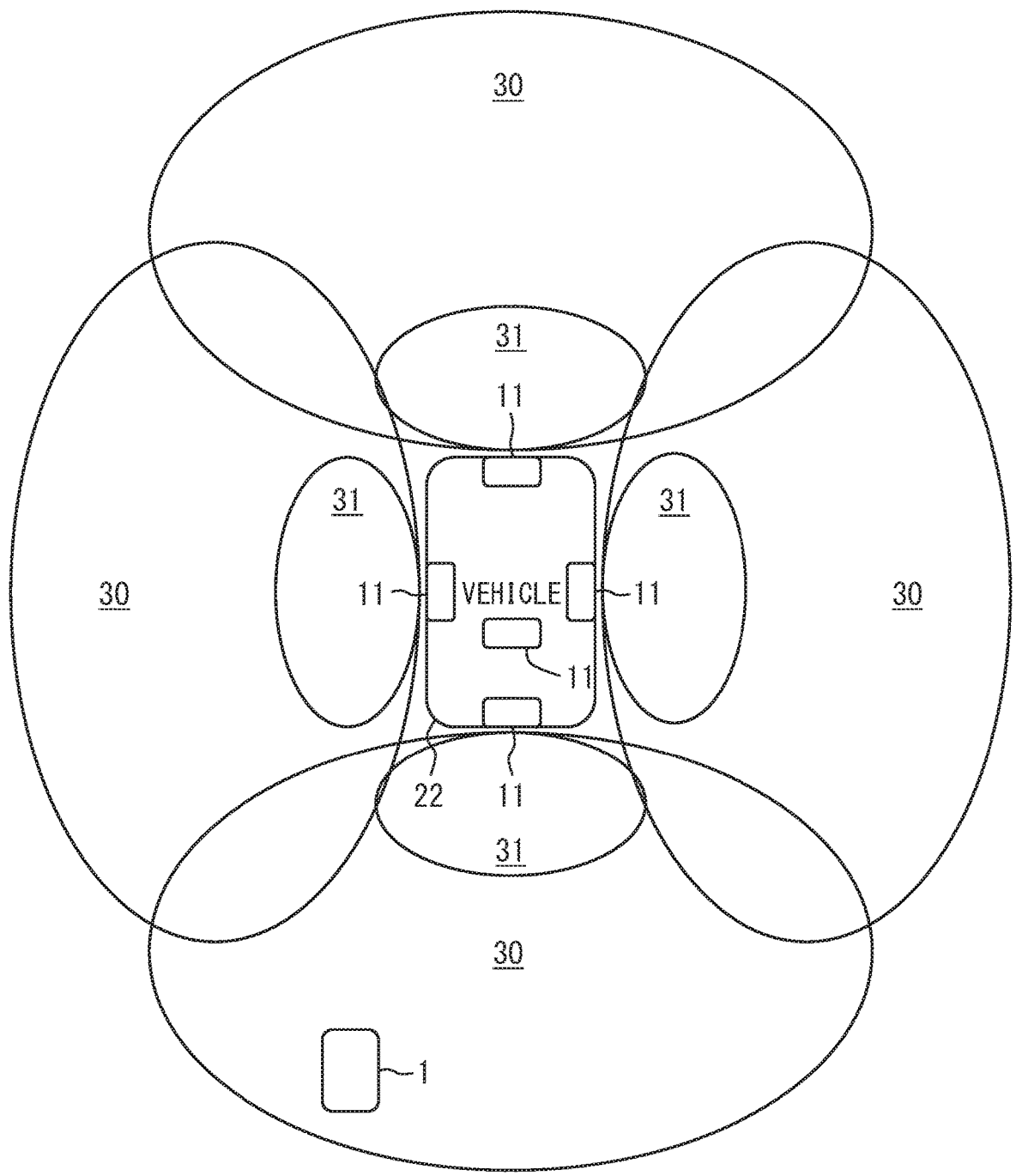
FIG. 4 is a bird's-eye view showing an example of the reception range and an execution range.

The next determination is a determination that is made when the LF antenna 11 for transmitting the radio wave toward the outside of the vehicle 22 is sequentially transmitting the radio wave. When the reception intensity confirmed by the reception intensity confirmation unit 18 is equal to or less than a first threshold value, the outside-execution-range determination unit 14b determines that the portable device 1 exists within the reception range 30 and outside an execution range 31. That is, the determination result is affirmative. As shown in FIG. 4, the execution range 31 is narrower than the reception range 30.

The execution range 31 is a range that enables the execution of welcome control which is vehicle control for welcoming the user holding the portable device 1 into the vehicle 22. The welcome control is, for example, the opening/closing of the door of the vehicle 22 executed in a system called a keyless entry system or a passive entry system. The welcome control is, for example, control for lighting up a room lamp or a light disposed at the foot of the vehicle. When the welcome control is executed, the authentication of the portable device 1 is performed. Therefore, it can also be said that the execution range 31 is a range in which the authentication is performed.

When the portable device 1 exists within the execution range 31, the vehicle control device 100 executes the welcome control. The welcome control can be executed from the longer distance as the execution range 31 becomes wider. To prevent theft, it is preferable that the execution range 31 be set to a predetermined distance from the vehicle 22. For example, the execution range 31 is set to within 1 m around the vehicle 22. The outside-execution-range determination unit 14b determines that the portable device 1 exists closer to the vehicle 22 as the reception intensity becomes larger. The first threshold value is set by the reception intensity indicating the size of the set execution range 31.

When the reception intensity is not equal to or less than the first threshold value, the outside-execution-range determination unit 14b determines that the portable device 1 exists within the execution range 31. That is, the determination result is negative. The sentence "the reception intensity is not equal to or less than the first threshold value" refers to a sentence "the reception intensity is larger than the first threshold value".

The inside-vehicle determination unit 14d determines whether or not the portable device 1 exists inside the vehicle 22 in a state where the radio wave is sequentially transmitted from the LF antenna 11 disposed in the cabin of the vehicle 22. When the reception intensity is larger than a second threshold value, the inside-vehicle determination unit 14d determines that the portable device 1 exists inside the vehicle 22. By transmitting the radio wave from the LF antenna 11 disposed in the cabin and measuring the reception intensity in the corner of the cabin or in the corner of the vehicle 22, the second threshold value is set based on the measured reception intensity. For example, the second threshold value is set to the reception intensity in the corner of the cabin, as it is.

The change request unit 15 outputs to the LF transmission unit 10 a reception sensitivity change request which is a request to change the reception range 30. The LF transmission unit 10 transmits the reception sensitivity change request to the portable device 1 from the LF antenna 11. The reception sensitivity varying unit 7 changes the reception sensitivity of the portable device 1 in accordance with the reception sensitivity change request. By changing the reception sensitivity, it is possible to change the reception range 30. The reception range 30 is narrowed as the reception sensitivity of the portable device 1 decreases. The reception sensitivity change request includes a reception sensitivity decrease request and a reception sensitivity increase request, as described later.

The change request unit 15 has a sensitivity decrease request unit 15a and a sensitivity increase request unit 15b. When the outside-execution-range determination unit 14b determines that the portable device 1 exists within the reception range 30 and outside the execution range 31, the sensitivity decrease request unit 15a transmits the reception sensitivity decrease request to the portable device 1.

The reception sensitivity decrease request is a request to narrow the reception range 30 so that the portable device 1 exists outside the reception range 30. The reception sensitivity decrease request is a request to decrease the reception sensitivity of the portable device 1. For example, when the portable device 1 exists within the reception range 30 and outside the execution range 31, the sensitivity decrease request unit 15a transmits the reception sensitivity decrease request to narrow the reception range 30 by a predetermined range to the portable device 1.

Figure 5:
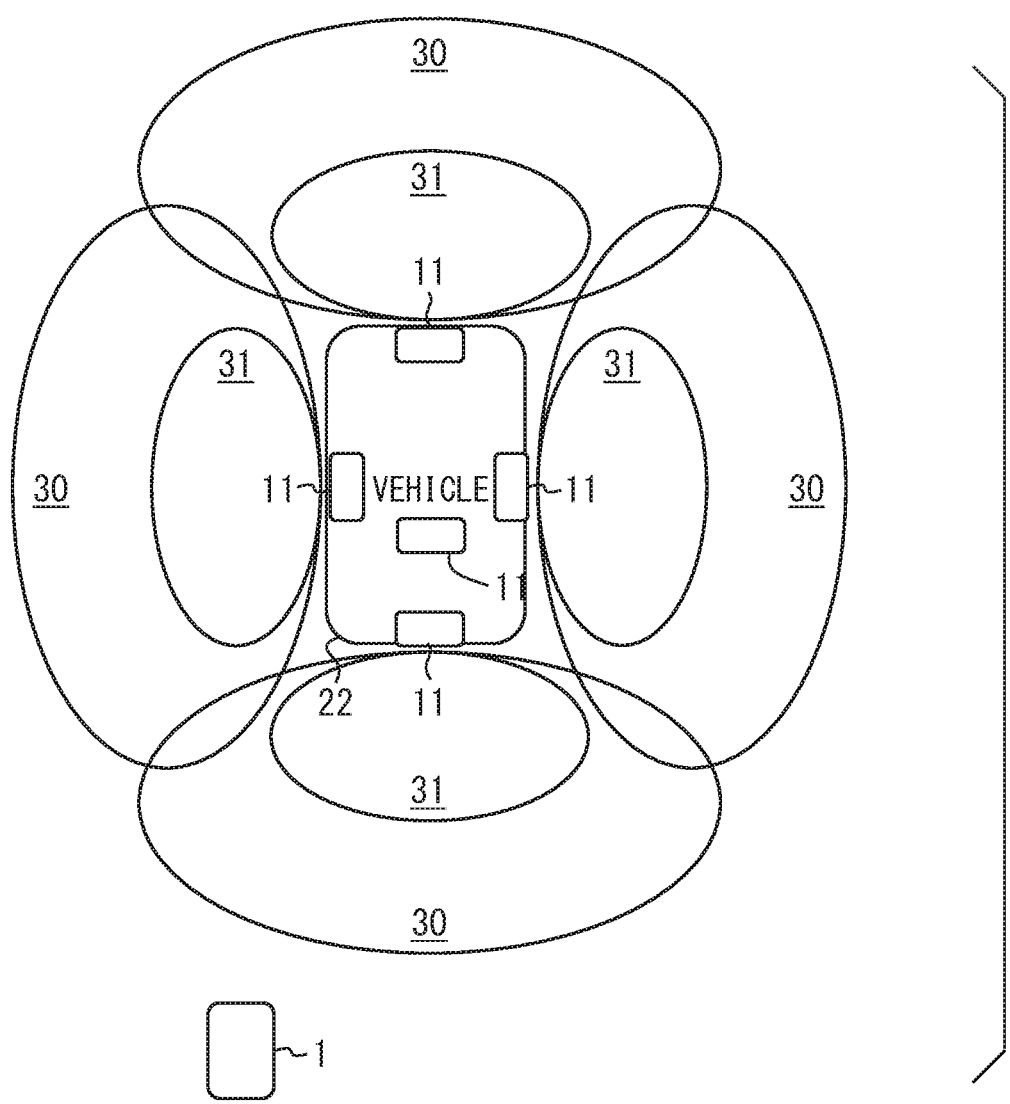
FIG. 5 is a bird's-eye view showing an example of the reception range and the execution range.

The reception sensitivity varying unit 7 decreases the reception sensitivity of the portable device 1, based on the decreased reception sensitivity decrease request. As shown in FIG. 5, the reception range 30 is narrowed by the reception sensitivity decrease request. Since the execution range 31 is determined by the reception intensity and the reception intensity is not affected by the reception sensitivity; even though the reception range 30 is narrowed by the decrease of the reception sensitivity, the size of the set execution range 31 does not change.

In FIG. 5, since the reception range 30 is narrowed, the portable device 1 exists at a location where the portable device 1 cannot receive the response request signal. Since the portable device 1 cannot receive the response request signal at the location in FIG. 5, the portable device 1 does not transmit the response signal. When it is determined that the portable device 1 exists within the reception range 30 and outside the execution range 31, the sensitivity decrease request unit 15a transmits the reception sensitivity decrease request until the portable device 1 cannot receive the response request signal.

It is preferable that the predetermined range be set to a small value. When the predetermined range is set to a large value, the reception range 30 is extremely narrowed by one reception sensitivity decrease request. When the reception range 30 becomes narrower than the preset execution range 31, the execution range 31 becomes the same range as the reception range 30. When the execution range 31 becomes an extremely narrow range, for example, the door lock of the vehicle 22 might be unable to be released unless the portable device 1 is brought to a location adjacent to the LF transmission unit 10. The vehicle control device 100 might be unable to execute the welcome control at a position where the welcome control should be originally executed, when the execution range 31 becomes the extremely narrow range. When the predetermined range is set to the small value, the sensitivity decrease request unit 15a narrows the reception range 30 little by little. By narrowing the reception range 30 little by little, the reception range 30 narrowed so as not to include the location where the portable device 1 exists can be larger than in the case where the predetermined range is set to the large value. In other words, by narrowing the reception range 30 little by little, it is possible to form the reception range 30 that slightly excludes the location where the portable device 1 exists while maintaining the reception range 30 at a size equivalent to or larger than the execution range 31. The equivalent size means that the reception range 30 may be a little narrower than the execution range 31. For example, the size of the reception range 30 that is 95% of the execution range 31 can be equivalent. Specifically, the size is not limited to 95%, and may be another numerical value such as 90%. The range that slightly excludes the location is, for example, a range where the distance between the portable device 1 and an edge of the reception range 30 closest to the portable device 1 is 50 cm. Thereby, the reception range 30 can be retained as widely as possible. The vehicle control device 100 can adjust the reception range 30 in accordance with the position of the portable device 1.

On the other hand, it is preferable to narrow the reception range 30 so that the portable device 1 cannot receive the response request signal by one reception sensitivity decrease request in order to suppress the consumption of the battery of the portable device 1. Therefore, in the case where priority is given to the suppression in the consumption of the battery of the portable device 1, it is preferable to set the predetermined range so that the portable device 1 becomes outside the reception range 30 by one reception sensitivity decrease request.

When the outside-execution-range determination unit 14b determines that the portable device 1 exists within the execution range 31, the sensitivity decrease request unit 15a transmits a signal that does not decrease the reception sensitivity. The signal that does not decrease the reception sensitivity is, for example, a signal indicating a request to maintain the current reception sensitivity of the portable device 1. The signal that does not decrease the reception sensitivity is, for example, a signal indicating a request to narrow the reception range 30 by 0 m. It is also possible that the sensitivity decrease request unit 15a does not transmit the reception sensitivity decrease request when the outside-execution-range determination unit 14b determines that the portable device 1 exists within the execution range 31.

When the portable device 1 exists within the execution range 31, the vehicle control device 100 executes the welcome control. In this case, when the reception sensitivity decrease request is transmitted, the execution range 31 might become narrower. When it is determined that the portable device 1 exists within the execution range 31; by transmitting the signal that does not decrease the reception sensitivity, it is possible to restrict the execution range from being narrowed.

The sensitivity increase request unit 15b transmits the reception sensitivity increase request to widen the reception range 30 to the portable device 1. The reception sensitivity increase request includes an entering sensitivity increase request and a leaving sensitivity increase request, as described later. When the entering action detection unit 17 detects an entering action, the sensitivity increase request unit 15b transmits the entering sensitivity increase request to widen the reception range 30 to the portable device 1. In this context, the reception range 30 is the reception range 30 in which the radio wave transmitted by the LF antenna 11 disposed in the cabin can be received. The above-described execution range 31 is narrower than the reception range 30 in which the radio wave transmitted by the LF antenna 11 disposed in the cabin can be received. The sensitivity decrease request unit 15a decreases the reception sensitivity, while maintaining the reception range 30 formed outside the vehicle 22 at a size larger than the execution range 31, to approach the reception range 30.

Therefore, even though the user holding the portable device 1 gets into the vehicle 22, the reception range 30 in which the radio wave transmitted by the LF antenna 11 disposed in the cabin can be received does not cover the whole of the vehicle 22 when the reception sensitivity of the portable device 1 remains decreased. By the reception sensitivity increase request, the reception range 30 is widened to at least a range including the periphery of the vehicle 22. In other words, by the reception sensitivity increase request, the reception range 30 is widened to at least the range including the whole of the vehicle 22.

The reason for widening to the range including the periphery of the vehicle 22 is to enable the portable device 1 to receive the response request signal even when the portable device 1 exists anywhere inside the vehicle 22. When the reception range 30 is narrower than the range including the periphery of the vehicle 22, the portable device 1 might be unable to receive the response request signal from the vehicle control device 100 even when the portable device 1 exists inside the vehicle 22. Therefore, the inside-vehicle determination unit 14d might be unable to determine whether or not the portable device 1 exists inside the vehicle 22. Due to inability to perform in-cabin authentication with the portable device 1, the vehicle control device 100 might be unable to perform vehicle control under the condition of in-vehicle authentication, for example, turn on the ignition SW. Therefore, the sensitivity increase request unit 15*b* needs to widen the reception range 30 so that the portable device 1 can receive the response request signal even when the portable device 1 exists anywhere inside the vehicle 22. It is determined, based on the reception intensity, whether or not the portable device 1 exists in the cabin or in the vehicle 22. Therefore, even when the reception range 30 in which the radio wave transmitted by the LF antenna 11 disposed in the cabin can be received is spread outside the vehicle 22, erroneous vehicle control is suppressed.

When the leaving action detection unit 16 detects a leaving action, the sensitivity increase request unit 15*b* transmits the leaving sensitivity increase request to make the reception range 30 wider than the execution range 31 to the portable device 1. It is preferable that the reception range 30 be widened to a range for executing walk-away control, by the leaving sensitivity increase request. In the case where the range for executing the walk-away control is wider than the execution range 31 for executing the welcome control and the range for executing the in-cabin authentication, the reception range 30 is widened to the maximum reception range 30 by the reception sensitivity increase request. By widening the reception range 30 on condition that the user has performed the leaving action, the executable range of the walk-away control can be widened to the range for originally executing the walk-away control. The walk-away control is vehicle control executed when the user has left the vehicle 22. The walk-away control is, for example, control for automatically closing an opened trunk room when the user holding the portable device 1 leaves the vehicle 22. The walk-away control is, for example, control for performing the door lock when the user holding the portable device 1 leaves the vehicle 22. In the walk-away control, it is preferable to expand the reception range 30 in order to confirm that the user has left the vehicle 22.

The authentication execution unit 19 confirms the correctness and/or validity of the portable device 1 based on the registration information of the response signal transmitted from the portable device 1. That is, the authentication execution unit 19 confirms at least one of the correctness and/or validity of the portable device 1. The confirmation of the correctness and/or validity is also referred to as authentication. When the authentication execution unit 19 can confirm the correctness and/or validity of the portable device 1, using the LF antenna 11 forming the reception range 30 outside the vehicle 22, the authentication execution unit 19 permits the execution of the welcome control and the walk-away control. Further, the authentication execution unit 19 executes the in-cabin authentication, using the LF antenna 11 disposed in the cabin, in order to determine whether or not the portable device 1 exists in the cabin.

(Processing of Vehicle Control Device)

Figure 6:
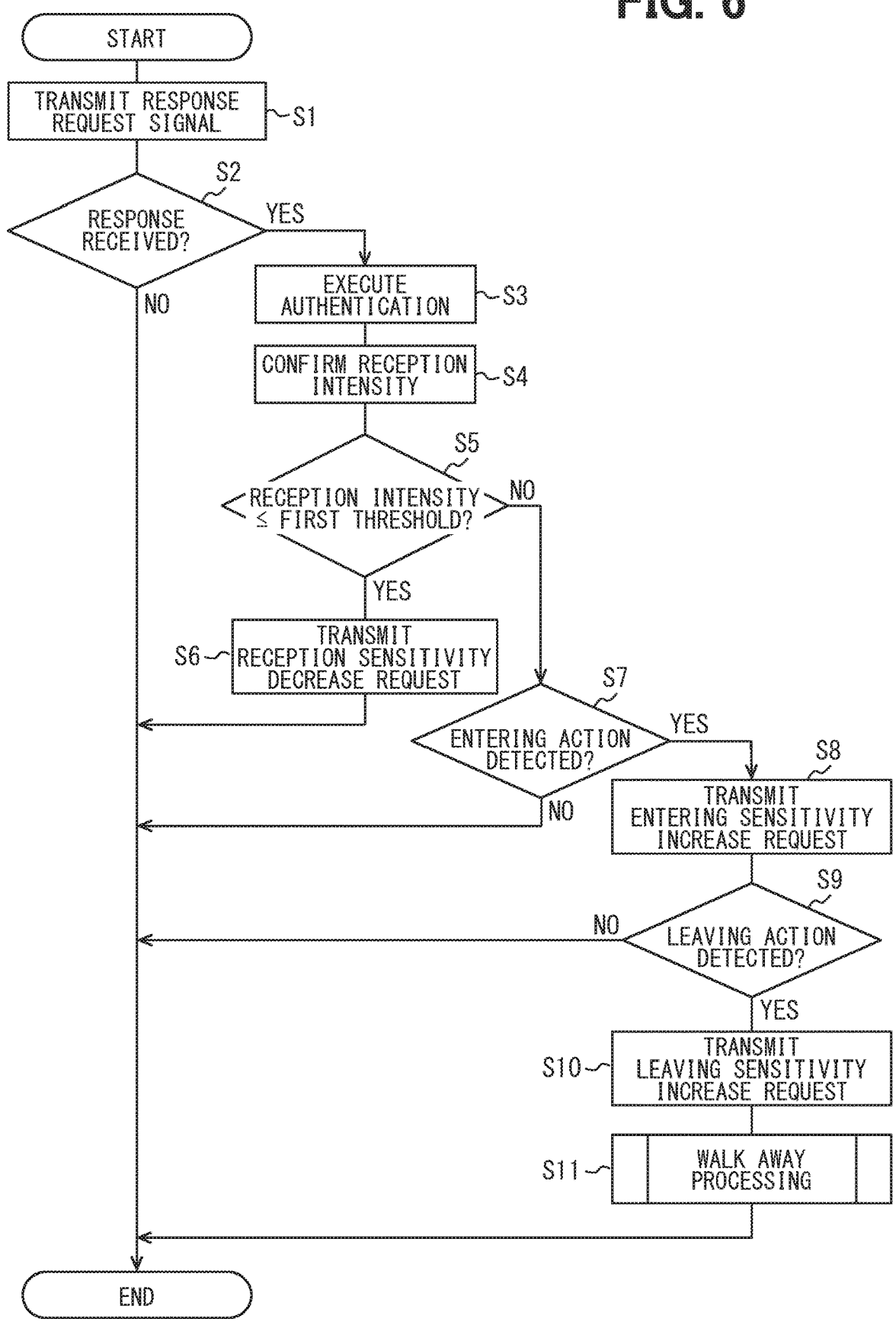
FIG. 6 is a flowchart showing processing of the vehicle control device.

Processing executed by the vehicle control device 100 will be described with reference to a flowchart shown in FIG. 6. The vehicle control device 100 always performs processing shown in FIG. 6 while the ignition of the vehicle 22 is on and off. However, in a state where it can be determined that the portable device 1 exists in the vehicle 22, the in-cabin authentication is executed instead of the processing shown in FIG. 6.

In step S1, the MCU 9 outputs the response request signal to the LF transmission unit 10, and moves to step S2. In step S2, the MCU 9 determines whether or not the response signal is received by the UHF reception unit 12. When the response signal is received, the MCU 9 determines that the portable device 1 exists within the reception range 30, and moves to step S3. When the response signal cannot be received, the MCU 9 determines that the portable device 1 does not exist within the reception range 30, and ends the flow. The MCU 9 executes step S2, and thereby provides the within-range determination unit 14*a*.

In step S3, the MCU 9 confirms the correctness and/or validity of the portable device 1 based on the registration information of the response signal transmitted from the portable device 1, and moves to step S4. The MCU 9 executes step S3, and thereby provides the authentication execution unit 19.

In step S4, the MCU 9 confirms the reception intensity of the portable device 1 based on the received response signal, and moves to step S5. In step S5, the MCU 9 determines the range in which the portable device 1 exists. When the reception intensity is equal to or less than the first threshold value, the MCU 9 determines that the portable device 1 exists within the reception range 30 and outside the execution range 31, and moves to step S6. When the reception intensity is larger than the first threshold value, the MCU 9 determines that the portable device 1 exists within the execution range 31, and moves to step S7. The MCU 9 executes step S5, and thereby provides the outside-execution-range determination unit 14*b*. In step S6, the MCU 9 transmits the reception sensitivity decrease request to the portable device 1, and ends the flow. The MCU 9 executes step S6, and thereby provides the sensitivity decrease request unit 15*a*.

In step S7, the MCU 9 determines whether or not the entering action is performed. When the MCU 9 determines that the entering action is performed, the MCU 9 moves to step S8. When the MCU 9 determines that the entering action is not performed, the MCU 9 ends the flow. The MCU 9 executes step S7, and thereby provides the entering action detection unit 17. In the state of the affirmative determination in S7, the correctness and/or validity of the portable device 1 is confirmed, and it can be determined that the reception intensity is an intensity when the portable device 1 exists within the execution range 31 or the vehicle.

In step S8, the MCU 9 transmits the entering sensitivity increase request to the portable device 1, and moves to step S9. The MCU 9 executes step S8, and thereby provides the sensitivity increase request unit 15*b*.

In step S9, the MCU 9 determines whether or not the leaving action is performed. When the MCU 9 determines that the leaving action is performed, the MCU 9 moves to step S10. When the MCU 9 determines that the leaving action is not performed, the MCU 9 ends the flow. The MCU 9 executes step S9, and thereby provides the leaving action detection unit 16. In the state of the affirmative determination in S9 as well, the correctness and/or validity of the portable device 1 is confirmed, and it can be determined that the reception intensity is the intensity when the portable device 1 exists within the execution range 31 or the vehicle.

In step S10, the MCU 9 transmits the leaving sensitivity increase request to the portable device 1, and moves to step S11. The MCU 9 executes step S10, and thereby provides the sensitivity increase request unit 15*b*. In step S11, the MCU 9 performs walk-away processing described later, and ends the flow.

(Processing of Portable Device)

Figure 7:
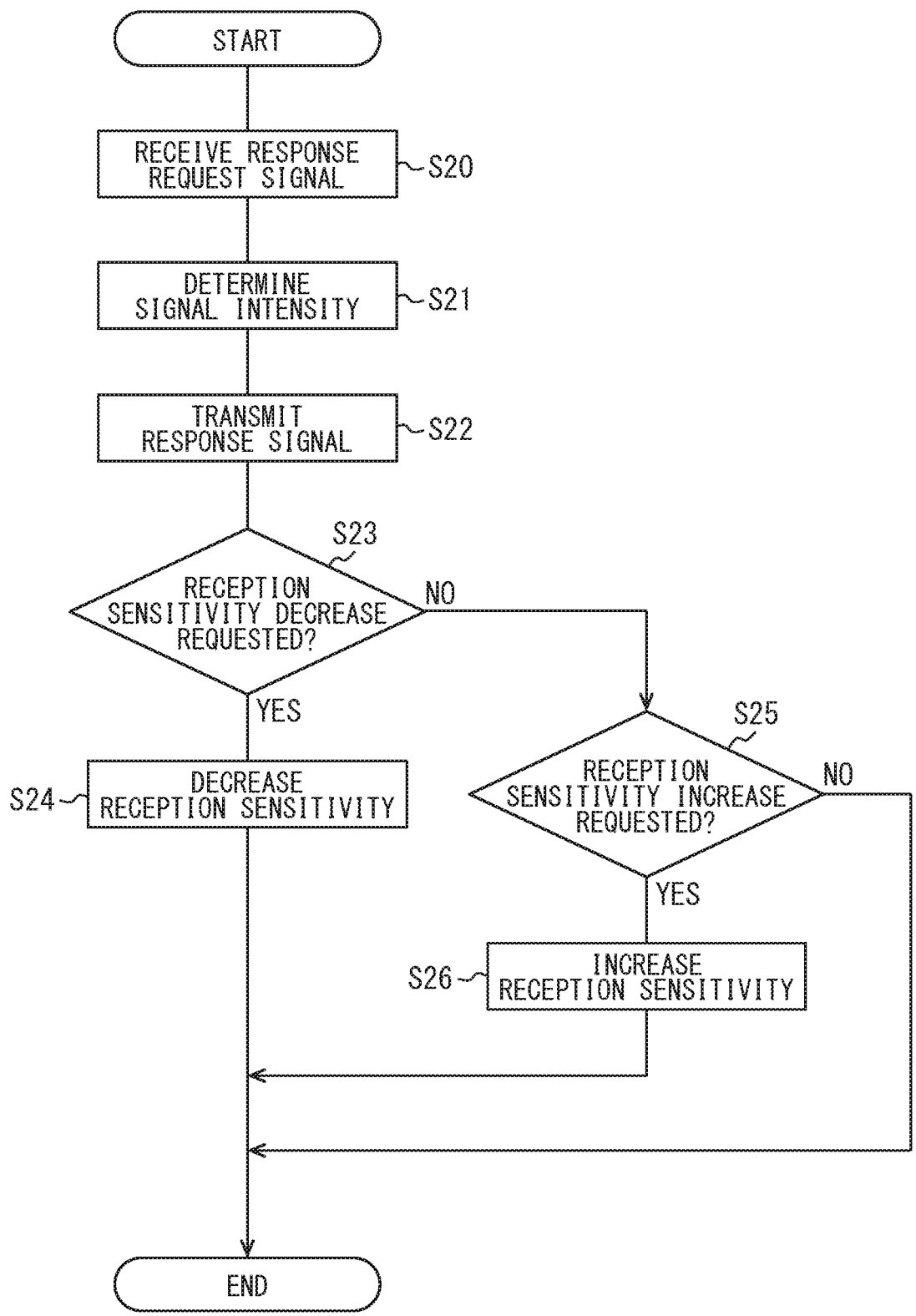
FIG. 7 is a flowchart showing processing of the portable device.

Processing executed by the portable device 1 will be described with reference to a flowchart shown in FIG. 7. The processing executed by the portable device 1 is executed under the condition of the reception of the response request signal.

In step S20, the portable device MCU 2 receives the response request signal transmitted from the LF transmission unit 10, and moves to step S21. In step S21, the portable device MCU 2 determines the reception intensity of the radio wave received by the LF reception unit 3, and moves to step S22. The portable device MCU 2 executes step S21, and thereby provides the reception intensity determination unit 8. In step S22, the portable device MCU 2 transmits the response signal from the transmission antenna 6, and moves to step S23.

In step S23, the portable device MCU 2 determines whether or not the reception sensitivity decrease request is received. When the portable device MCU 2 determines that the reception sensitivity decrease request is received, the portable device MCU 2 moves to step S24. When the portable device MCU 2 determines that the reception sensitivity decrease request is not received, the portable device MCU 2 moves to step S25. In step S24, the portable device MCU 2 decreases the reception sensitivity of the portable device 1, based on the received reception sensitivity decrease request, and ends the flow.

In step S25, the portable device MCU 2 determines whether or not the reception sensitivity increase request is received. When the portable device MCU 2 determines that the reception sensitivity increase request is received, the portable device MCU 2 moves to step S26. When the portable device MCU 2 determines that the reception sensitivity increase request is not received, the portable device MCU 2 ends the flow.

In step S26, the portable device MCU 2 increases the reception sensitivity of the portable device 1, based on the received reception sensitivity increase request, and ends the flow. The portable device MCU 2 changes the ratio of increase in the reception sensitivity, depending on whether the received reception sensitivity increase request is the leaving sensitivity increase request or the entering sensitivity increase request. Instead of this, the reception sensitivity may be increased by the same ratio, regardless of whether the received reception sensitivity increase request is the leaving sensitivity increase request or the entering sensitivity increase request. For example, the reception sensitivity is increased so as to widen the reception range to the maximum reception range 30 by the reception sensitivity increase request. The portable device MCU 2 executes at least one of step S23 to step S26, and thereby provides the reception sensitivity varying unit 7.

In the processing executed by the vehicle control device 100 and the processing executed by the portable device 1, when the portable device 1 exists within the reception range 30 and outside the execution range 31, the vehicle control device 100 transmits the reception sensitivity decrease request to the portable device 1. When the portable device 1 receives the reception sensitivity decrease request, the portable device 1 decreases the reception sensitivity. The vehicle control device 100 can thereby narrow the reception range 30 of the portable device 1. Even though the reception range 30 of the portable device 1 is narrowed, when the portable device 1 exists within the reception range 30 and outside the execution range 31, the vehicle control device 100 transmits the reception sensitivity decrease request again. By repeating these steps, the vehicle control device 100 can narrow the reception range 30 until the portable device 1 does not receive the response request signal.

When the entering action of the user is detected, the vehicle control device 100 transmits the reception sensitivity increase request to the portable device 1. When the portable device 1 receives the reception sensitivity increase request, the portable device 1 increases the reception sensitivity. By the reception sensitivity increase request, the vehicle control device 100 can widen the reception range 30. Thereby, it can be stably determined that the portable device 1 exists inside the vehicle 22.

(Walk-Away Processing)

Figure 8:
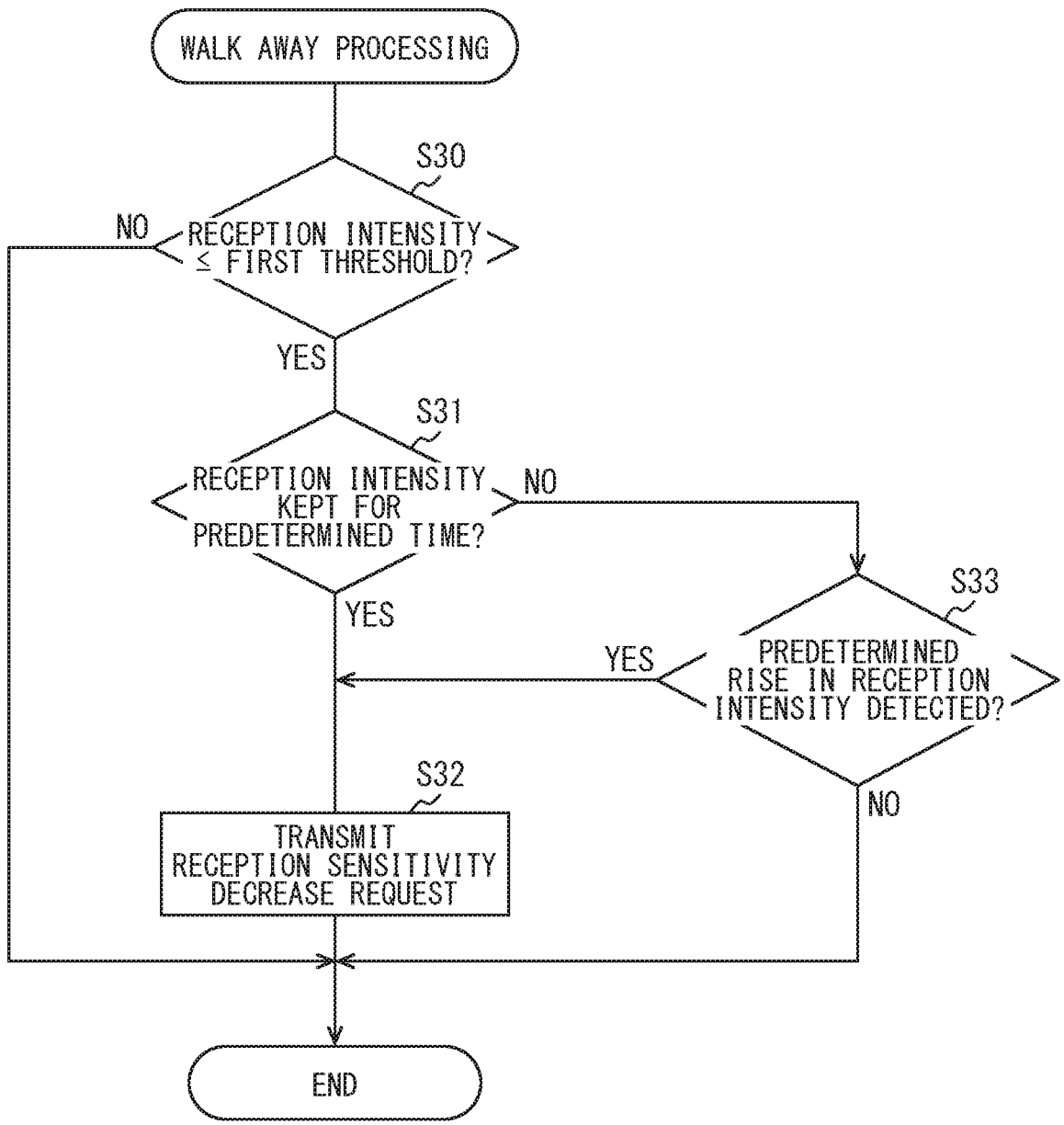
FIG. 8 is a flowchart showing walk-away processing.

Walk-away processing executed by the vehicle control device 100 will be described with reference to a flowchart shown in FIG. 8. The walk-away processing is processing for determining whether or not to maintain the reception range 30 widened to the executable range of the walk-away control after the leaving action of the user is detected.

In step S30, when the reception intensity is equal to or less than the first threshold value, the MCU 9 determines that the portable device 1 exists within the reception range 30 and outside the execution range 31, and moves to step S31. When the reception intensity is larger than the first threshold value, the MCU 9 determines that the portable device 1 exists within the execution range 31, and ends the flow. The MCU 9 executes step S30, and thereby provides the outside-execution-range determination unit 14b.

In step S31, the MCU 9 determines whether or not the reception intensity remains the same value for a predetermined time. When the reception intensity remains the same value for the predetermined time, the MCU 9 moves to step S32. When the reception intensity does not remain the same value for the predetermined time, the MCU 9 moves to step S33. The predetermined time can be a time by which it can be assumed that the portable device 1 is placed on a storage space such as a shelf or a desk, and is, for example, 30 seconds. The same value does not need to be exactly the same value, and can be a value by which it can be assumed that the portable device 1 is not moved. In step S32, the MCU 9 transmits the reception sensitivity decrease request to the portable device 1.

In step S33, the MCU 9 determines whether or not a predetermined rise in the reception intensity is detected. When the predetermined rise in the reception intensity is detected, the MCU 9 moves to step S32, and transmits the reception sensitivity decrease request to the portable device 1. The predetermined rise can be a value by which it can be assumed that the user is approaching the vehicle 22. When the predetermined rise in the reception intensity is not detected, the MCU 9 ends the flow. The MCU 9 executes at least one of step S31 to step S33, and thereby provides the sensitivity decrease request unit 15a.

According to the above-described embodiment, when the reception intensity is equal to or less than the first threshold value, the outside-execution-range determination unit 14b determines that the portable device 1 exists within the reception range 30 and outside the execution range 31. When the portable device 1 exists within the reception range 30 and outside the execution range 31, the sensitivity decrease request unit 15a transmits the reception sensitivity decrease request to the portable device 1. The sensitivity decrease request unit 15a narrows the reception range 30 until the portable device 1 cannot receive the response request signal.

Even when the portable device 1 exists within the reception range 30, the sensitivity decrease request unit 15a narrows the reception range 30 so that the portable device 1 exists outside the reception range 30. Since the portable device 1 exists outside the reception range 30, the number of times that the portable device 1 responds to the response request signal is decreased. It is thereby possible to suppress the consumption of the battery included in the portable device 1.

After the leaving sensitivity increase request is transmitted, when the outside-execution-range determination unit 14b determines that the portable device 1 exists within the reception range 30 and outside the execution range 31 and the reception intensity remains the same value for the predetermined time, the sensitivity decrease request unit 15a transmits the reception sensitivity decrease request to the portable device 1. When the portable device 1 is placed on the storage space for the predetermined time, the vehicle control device 100 narrows the reception range 30. The reception range 30 is thereby adjusted so that the portable device 1 exists outside the reception range 30. Since the portable device 1 exists outside the reception range 30, the repetition of a response to the response request signal is decreased. It is thereby possible to suppress the consumption of the battery included in the portable device 1.

After the leaving sensitivity increase request is transmitted, when the predetermined rise in the reception intensity is detected, the sensitivity decrease request unit 15a transmits the reception sensitivity decrease request to the portable device 1. When the user is away from the vehicle 22, the vehicle control device 100 maintains the reception range 30 in the widened state in order to execute the walk-away control. This enables the wider reception range 30. It is possible to both widen the range in which the portable device 1 can receive the response request signal and suppress the consumption of the battery included in the portable device 1.

Other Embodiments

The disclosure in this specification is not limited to the illustrated embodiments. The disclosure embraces the illustrated embodiments and modified forms made by those skilled in the art based thereon. For example, the disclosure in this specification is not limited to the combinations of the components and/or elements shown in the embodiments. The disclosure can be performed by various combinations. The disclosure can have an additional part that can be added to the embodiments. The disclosure embraces the omission of a component and/or an element in the embodiments. The disclosure embraces the replacement or combination of components and/or elements between one embodiment and another embodiment. The disclosed technical scope is not limited to the description in the embodiments. It should be understood that the several disclosed technical scopes are indicated by the description in the appended claims and embrace all changes which come within the meaning and range of equivalency of the description in the claims.

Second Embodiment

In the first embodiment, when the portable device 1 exists within the reception range 30 and outside the execution range 31, the sensitivity decrease request unit 15a transmits the reception sensitivity decrease request to narrow the reception range 30 by the predetermined range to the portable device 1. Instead of this, when the within-range determination unit 14a determines that the portable device 1 exists within the reception range 30, the sensitivity decrease request unit 15a may transmit the reception sensitivity decrease request to the portable device 1. The sensitivity decrease request unit 15a narrows the reception range 30 until the portable device 1 does not respond to the response request signal. Since the portable device 1 exists outside the reception range 30, the number of times that the portable device 1 responds to the response request signal is decreased.

Even when the portable device 1 exists within the reception range 30, the sensitivity decrease request unit 15a narrows the reception range 30 so that the portable device 1 exists outside the reception range 30. Since the portable device 1 exists outside the reception range 30, the portable device 1 does not repeatedly respond to the response request signal. It is thereby possible to suppress the consumption of the battery included in the portable device 1.

Third Embodiment

In the first embodiment, the outside-execution-range determination unit 14b determines the range in which the portable device 1 exists, based on the reception intensity. Instead of this, the LF transmission unit 10 may transmit the response request signal to the portable device 1 multiple times while changing the transmission output. The outside-execution-range determination unit 14b may determine the range in which the portable device 1 exists, by the presence or absence of the response from the portable device 1 for each transmission output.

Fourth Embodiment

In the first embodiment, when it is determined that the entering action is performed (S7: YES) and when it is determined that the leaving action is performed (S9: YES), the sensitivity increase request is transmitted. In the state of the affirmative determination in S7, S9, the correctness and/or validity of the portable device 1 is confirmed, and it can be determined that the reception intensity is the intensity when the portable device 1 exists within the execution range or the vehicle.

However, the state where the correctness and/or validity of the portable device 1 is confirmed, and it can be determined that the reception intensity is the intensity when the portable device 1 exists within the execution range or the vehicle is not limited thereto.

The vehicle control device 100 performs authentication when the vehicle control device 100 determines that the portable device 1 enters the execution range 31. Further, the vehicle control device 100 determines, based on the reception intensity, whether or not the portable device 1 enters the execution range 31. Therefore, the vehicle control device 100 may transmit the sensitivity increase request when the vehicle control device 100 determines that the portable device 1 enters the execution range 31 and the authentication is established. The sensitivity indicated by the sensitivity increase request may be the same as the entering sensitivity increase request, or may be the same as the leaving sensitivity increase request. In this embodiment, one kind of sensitivity increase request is used.

When the portable device 1 enters the execution range 31, the portable device 1 responds to the response request signal, even in the decreased state of the sensitivity. Therefore, after determining that the portable device 1 enters the execution range 31, it is not necessary to maintain the reception sensitivity of the portable device 1 in the decreased state. That is, after the portable device 1 enters the execution range 31, the sensitivity of the portable device 1 can be increased without problems.

Fifth Embodiment

In the first embodiment, in the walk-away processing executed after the leaving sensitivity increase request is transmitted, when the reception intensity is equal to or less than the first threshold value, and the reception intensity remains the same reception intensity for the predetermined time or the predetermined rise in the reception intensity is detected, the reception sensitivity decrease request is transmitted.

However, the sensitivity decrease request unit 15a may transmit the reception sensitivity decrease request immediately when the reception intensity is equal to or less than the first threshold value after the leaving sensitivity increase request is transmitted. The reception intensity may be determined after the reception sensitivity increase request other than the leaving sensitivity increase request is transmitted. The sentence "the reception intensity is equal to or less than the first threshold value" means that the affirmative determination is made by the outside-execution-range determination unit 14b.

That is, after the reception sensitivity increase request is transmitted, when the affirmative determination is made by the outside-execution-range determination unit 14b, the sensitivity decrease request unit 15a may transmit the reception sensitivity decrease request to the portable device 1.

Sixth Embodiment

In the first embodiment, the portable device 1 determines the reception intensity of the response request signal, and then transmits the response signal having the reception intensity information indicating the reception intensity to the vehicle control device 100. Then, the vehicle control device 100 confirms the reception intensity, and transmits the reception sensitivity decrease request based on the confirmed result.

Figure 9:
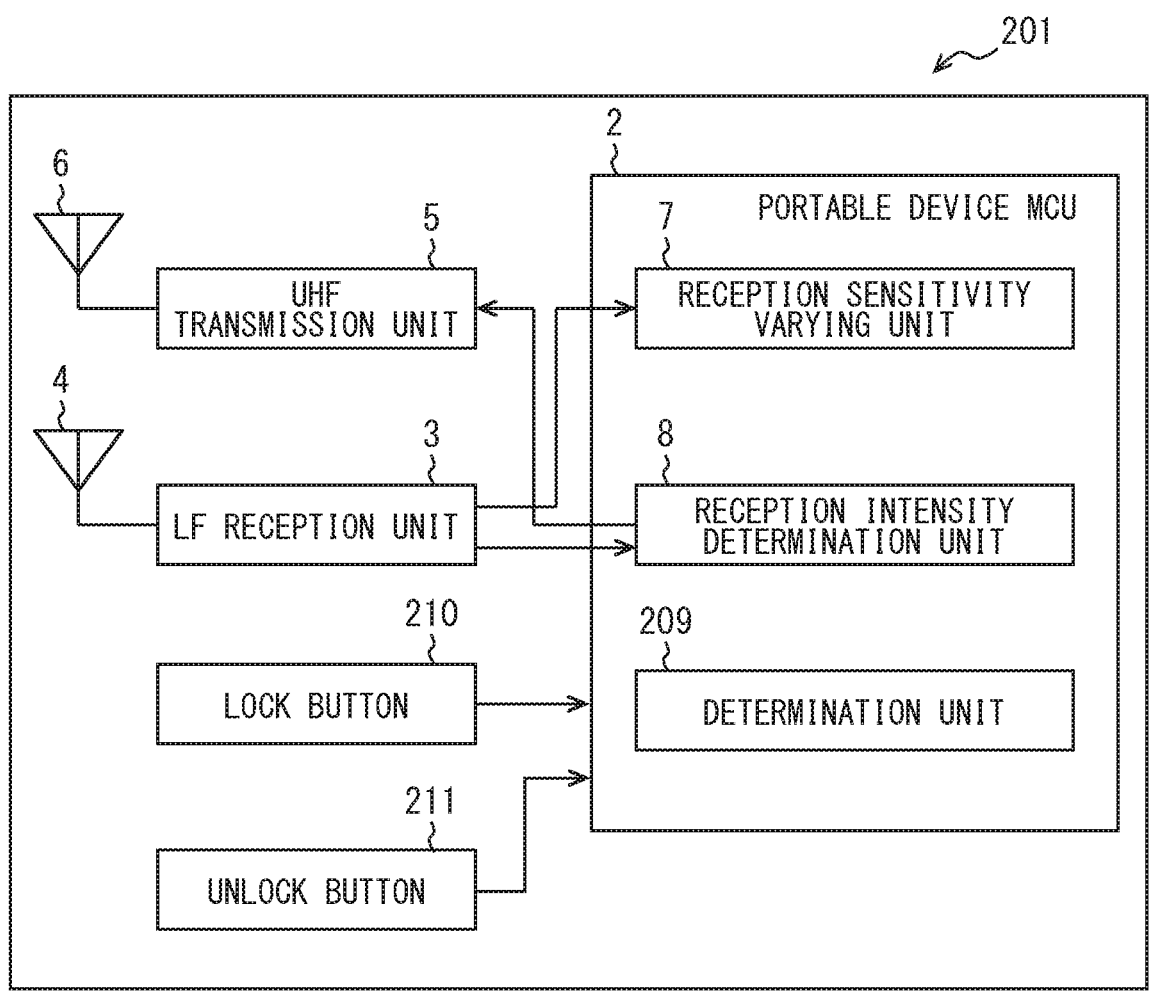
FIG. 9 is a block diagram showing a portable device according to a sixth embodiment.
Figure 10:
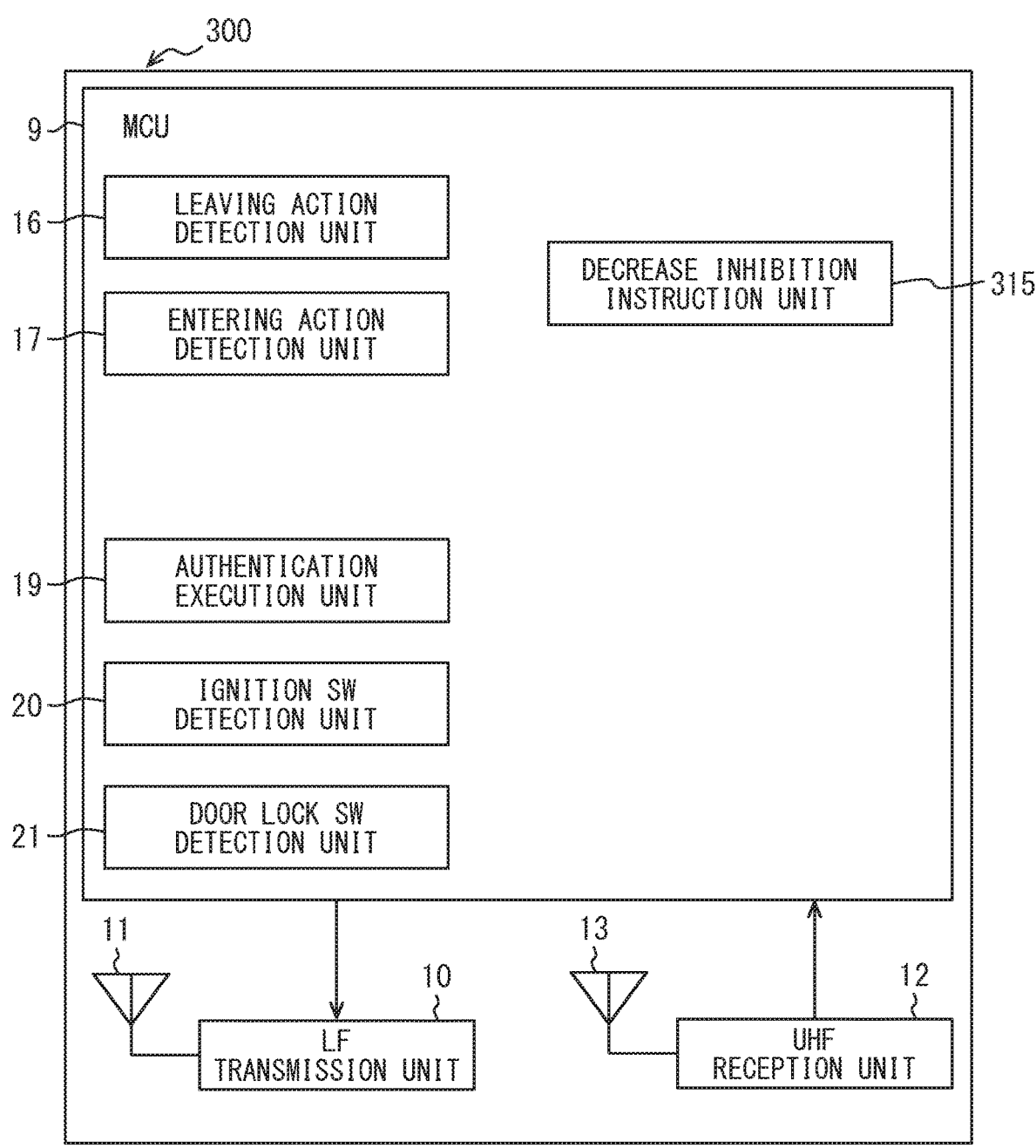
FIG. 10 is a block diagram showing a vehicle control device according to the sixth embodiment.

However, in a sixth embodiment, a portable device 201 itself determines the necessity or unnecessity of decreasing the reception sensitivity. FIG. 9 shows the configuration of the portable device 201 according to the sixth embodiment. FIG. 10 shows the configuration of a vehicle control device 300 according to the sixth embodiment.

As shown in FIG. 9, in the portable device 201, an MCU 2 includes a determination unit 209. The determination unit 209 determines whether the current position is within the execution range 31 or is within the reception range 30 but outside the execution range 31, based on the reception intensity determined by the reception intensity determination unit 8. There is a correlation between the reception intensity and a distance from a radio wave transmission source, and there is a correlation between the distance and the reception intensity. Therefore, it can be determined whether or not the current position is within the execution range 31. The portable device 201 stores the reception intensity on the boundary of the execution range 31. The reception intensity on the boundary of the execution range 31 is the first threshold value described above.

That is, the determination unit 209 compares the reception intensity determined by the reception intensity determination unit 8 with the first threshold value, and thereby determines whether the current position is within the execution range 31 or is within the reception range 30 but outside the execution range 31. Then, the determination unit 209 instructs the reception sensitivity varying unit 7 to change the reception sensitivity, based on the determination result.

More specifically, when the determination unit 209 determines that the current position is within the reception range 30 but outside the execution range 31, the determination unit 209 issues an instruction for decreasing the reception sensitivity to the reception sensitivity varying unit 7. The degree of decrease in the reception sensitivity can be the same as in the first embodiment.

However, even when the determination unit 209 determines that the current position is within the reception range 30 but outside the execution range 31; when a command for instructing inhibition of the sensitivity decrease is included in a signal received from the vehicle control device 300, the determination unit 209 does not output the instruction for decreasing the reception sensitivity to the reception sensitivity varying unit 7 while a condition specified by the command is established. On the other hand, when the command for instructing the inhibition of the sensitivity decrease is not included in the signal received from the vehicle control device 300, the instruction for decreasing the reception sensitivity is outputted to the reception sensitivity varying unit 7.

Further, when the determination unit 209 determines that the current position is within the execution range 31, when the reception sensitivity is in the decreased state, the determination unit 209 instructs the reception sensitivity varying unit 7 to increase the reception sensitivity. The degree of increase in the reception sensitivity can also be the same as in the first embodiment.

FIG. 10 shows the configuration of the vehicle control device 300 according to the sixth embodiment. An MCU 9 of the vehicle control device 300 includes a decrease inhibition instruction unit 315. When the leaving action detection unit 16 detects the leaving action, the decrease inhibition instruction unit 315 causes the response request signal to include the command for instructing the inhibition of the sensitivity decrease, and transmits the response request signal.

The sensitivity decrease inhibition which is specifically instructed by the command is, for example, the prohibition of the sensitivity decrease for a fixed time. Alternatively, an instruction for prohibiting the reception sensitivity decrease until the portable device falls outside a threshold decrease range which is set to be within the reception range 30 but wider than the execution range 31 may be issued. The portable device 201 determines, based on the reception intensity, whether or not to fall outside the threshold decrease range.

By transmitting the command, it is possible to temporarily execute vehicle control requiring communication with the portable device 201 even outside the execution range 31. In addition, when the condition specified by the command is not established, since the portable device 201 decreases the reception sensitivity, it is possible to suppress battery consumption.

Seventh Embodiment

In the first embodiment, by decreasing or increasing the reception sensitivity of the portable device 1, the reception range 30 is changed, and the intensity of the radio wave transmitted by the vehicle control device 100 is not changed. However, the reception range 30 is changed also by changing the intensity of the radio wave transmitted by the vehicle control device 100.

In a seventh embodiment, when the outside-execution-range determination unit 14b determines that the portable device 1 exists within the reception range 30 but outside the execution range 31, the vehicle control device 100 decreases the transmission power of the signal transmitted from the LF transmission unit 10. The decrease of the transmission power narrows the reception range 30 so that the portable device 1 is positioned outside the reception range 30 while maintaining the reception range 30 at the size larger than the execution range 31.

Eighth Embodiment

In the first embodiment, the vehicle control device 100 is the transmission side device, and the response request signal transmitted by the vehicle control device 100 is the intensity determination signal. Further, the portable device 1 is the reception side device, and the portable device 1 determines the reception intensity.

However, in an eighth embodiment, the portable device 1 is the transmission side device, and the vehicle control device 100 is the reception side device. Therefore, the signal (e.g., the response signal) transmitted by the portable device 1 is the intensity determination signal, and the vehicle control device 100 determines the reception intensity of the signal transmitted by the portable device 1.

Further, in the eighth embodiment, after the vehicle control device 100 determines the reception intensity, the vehicle control device 100 performs the same processing as the processing after the reception intensity confirmation unit 18 confirms the reception intensity in the first embodiment. Therefore, in the eighth embodiment, by changing the reception sensitivity of the portable device 1, the reception range 30 is changed.

Ninth Embodiment

In a ninth embodiment, the portable device 1 is the transmission side device, and the vehicle control device 100 is the reception side device, as in the eighth embodiment. In the ninth embodiment, processing after the vehicle control device 100 determines the reception intensity is the same as in the seventh embodiment. Therefore, in the ninth embodiment, by changing the transmission power of the LF transmission unit 10, the reception range 30 is changed.

Tenth Embodiment

The radio wave used for transmission by the vehicle control devices 100, 300, that is, the radio wave also used for reception by the portable devices 1, 201 may be a frequency band other than the LF band, for example, a VLF band or a UHF band. The UHF band can be the same frequency band as the frequency band used by the UHF reception unit 12.

What is claimed is:

1. A reception range varying system that includes a vehicle control device and a portable device, and is configured such that a reception range in which the portable device can receive a response request signal transmitted by the vehicle control device is variable, and in which:
   the vehicle control device and the portable device each include a processor and memory,
   one of the vehicle control device and the portable device is configured to transmit an intensity determination signal, and
   the other of the vehicle control device and the portable device is configured to receive the intensity determination signal and determine a reception intensity of the received intensity determination signal,
   wherein: the processor and memory of the vehicle control device are configured to (i) determine whether a position of the portable device is within an execution range which enables execution of vehicle control over the portable device, or within the reception range but outside the execution range, based on the determined reception intensity, and (ii) transmit to the portable device a plurality of reception sensitivity decrease requests, each requesting the portable device to decrease a reception sensitivity of the portable device by a predetermined range, to incrementally decrease the reception sensitivity of the portable device and narrow the reception range until the portable device cannot receive the response request signal and is positioned outside of the reception range while maintaining the reception range at a size equivalent to or larger than the execution range, in response to determining that the position of the portable device is within the reception range but outside the execution range;
   the processor and memory of the portable device are configured to cause the portable device to decrease the reception sensitivity of the portable device by the predetermined range and narrow the reception range in response to receiving each reception sensitivity decrease request of the plurality of reception sensitivity decrease requests; and
   the processor and memory of the vehicle control device are further configured to:
   transmit a reception sensitivity increase request to increase the reception sensitivity of the portable device in order to widen the reception range to the portable device;
   detect an entering action indicating that the portable device has entered a vehicle;
   transmit to the portable device an entering sensitivity increase request to widen the reception range to determine that the portable device is inside the vehicle in response to detecting the entering action;
   detect a leaving action indicating that the portable device has left the vehicle; and
   transmit to the portable device a leaving sensitivity increase request to widen the reception range in response to detecting the leaving action;
   wherein:
   the entering sensitivity increase request and the leaving sensitivity increase request each indicate a rate of increase in the reception sensitivity and the rate of increase in the reception sensitivity indicated by the leaving sensitivity increase request is different from the rate of increase in the reception sensitivity indicated by the entering sensitivity increase request; and
   the leaving sensitivity increase request increases the reception sensitivity so as to widen the reception range to a maximum reception range.

2. The reception range varying system according to claim 1, wherein
   the vehicle control device is configured to transmit the intensity determination signal,
   the portable device is configured to receive the intensity determination signal and determine the reception intensity of the received intensity determination signal,
   the portable device transmits a measurement result signal including the determined reception intensity to the vehicle control device, and
   the processor and memory of the vehicle control device are further configured to determine whether the position of the portable device is within the execution range, or within the reception range but outside the execution range, based on the reception intensity included in the measurement result signal.

3. The reception range varying system according to claim 1, wherein
the vehicle control device is configured to transmit the intensity determination signal, and
the portable device is configured to receive the intensity determination signal and determine the reception intensity of the received intensity determination signal.

4. The reception range varying system according to claim 1, wherein the processor and memory of the vehicle control device are further configured to:
in response to determining that the portable device is located within the reception range but outside the execution range based on the reception intensity and to determining that the reception intensity remains the same value for a predetermined period of time after the reception sensitivity is increased by the leaving sensitivity increase request, transmit the plurality of reception sensitivity decrease requests again to decrease the reception sensitivity until the portable device is located outside of the reception range.

5. A vehicle control device comprising a processor and memory configured to:
transmit a response request signal for requesting a response from a portable device;
receive a response signal returned by the portable device in response to the response request signal;
determine a range in which the portable device is located;
transmit to the portable device a reception sensitivity change request which is a request to change a reception range in which the portable device can receive the response request signal, based on the range in which the portable device is located;
confirm a reception intensity of the portable device, based on the response signal;
set an execution range that enables execution of vehicle control over the portable device and is narrower than the reception range;
determine that the portable device is located within the reception range and outside the execution range when the reception intensity is equal to or less than a predetermined threshold value;
transmit to the portable device a plurality of reception sensitivity decrease requests, each requesting the portable device to decrease a reception sensitivity of the portable device by a predetermined range, to incrementally decrease the reception sensitivity of the portable device and narrow the reception range until the portable device is located outside of the reception range, in response to determining that the portable device is located within the reception range and outside the execution range;
transmit a reception sensitivity increase request to increase the reception sensitivity in order to widen the reception range to the portable device;
detect an entering action by which the portable device can be assumed to get into a vehicle;
transmit to the portable device an entering sensitivity increase request which is the reception sensitivity increase request to widen the reception range so as to be able to determine that the portable device is inside the vehicle, in response to detecting the entering action;
detect a leaving action by which the portable device can be assumed to be leaving the vehicle; and
transmit to the portable device a leaving sensitivity increase request which is the reception sensitivity increase request to widen the reception range, in response to detecting the leaving action;

wherein:
the entering sensitivity increase request and the leaving sensitivity increase request each indicate a rate of increase in the reception sensitivity and the rate of increase in the reception sensitivity indicated by the leaving sensitivity increase request is different from the rate of increase in the reception sensitivity indicated by the entering sensitivity increase request; and
the leaving sensitivity increase request increases the reception sensitivity so as to widen the reception range to a maximum reception range.

6. The vehicle control device according to claim 5, wherein the processor and memory are further configured to:
determine that the portable device is located within the execution range in response to a determination result being negative; and
transmit a signal that inhibits decrease of the reception sensitivity to the portable device, in response to determining that the portable device is located within the execution range.

7. The vehicle control device according to claim 5, wherein the processor and memory are further configured to:
confirm at least one of correctness and validity of the portable device, based on a signal transmitted to and received from the portable device; and
transmit the reception sensitivity increase request to the portable device, in response to confirming the at least one of the correctness and validity of the portable device and the reception intensity being determined to be an intensity when the portable device is located within the execution range of the vehicle.

8. The vehicle control device according to claim 5, wherein the processor and memory are further configured to:
transmit the reception sensitivity decrease request to the portable device, based on an affirmative determination made after the reception sensitivity increase request is transmitted.

9. The vehicle control device according to claim 5, wherein the processor and memory are further configured to:
transmit the reception sensitivity decrease request to the portable device in response to an affirmative determination being made; wherein the reception intensity remains the same value for a predetermined time, after the leaving sensitivity increase request is transmitted.

10. The vehicle control device according to claim 5, wherein the processor and memory are further configured to:
transmit the reception sensitivity decrease request to the portable device in response to a predetermined rise in the reception intensity being detected after the leaving sensitivity increase request is transmitted.

11. A portable device to be operable with the vehicle control device according to claim 5, the portable device comprising a processor and memory configured to:
receive the response request signal and the reception sensitivity change request;
change a reception sensitivity in accordance with the received reception sensitivity change request;
determine a reception intensity of the received response request signal; and
transmit to the vehicle control device the response signal including reception intensity information indicating the determined reception intensity.

12. The vehicle control device according to claim 5, wherein the processor and memory are further configured to:
in response to determining that the portable device is located within the reception range but outside the execution range based on the reception intensity and to determining that the reception intensity remains the same value for a predetermined period of time after the reception sensitivity is increased by the leaving sensitivity increase request, transmit the plurality of reception sensitivity decrease requests again to decrease the reception sensitivity until the portable device is located outside of the reception range.

* * * * *